(12) United States Patent
Koeth et al.

(10) Patent No.: US 9,501,087 B1
(45) Date of Patent: Nov. 22, 2016

(54) DYNAMICALLY CLOCKED DDS FOR SPUR OPTIMIZATION

(71) Applicant: RAYTHEON COMPANY, Waltham, MA (US)

(72) Inventors: Matthew J. Koeth, Plano, TX (US); Michael R. Patrizi, Allen, TX (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 14/742,369

(22) Filed: Jun. 17, 2015

(51) Int. Cl.
*H03B 21/00* (2006.01)
*G06F 1/03* (2006.01)

(52) U.S. Cl.
CPC .................. *G06F 1/0321* (2013.01)

(58) Field of Classification Search
CPC ..... G06F 1/0328; H03K 4/026; H04M 1/505
USPC ....... 327/107, 262, 264, 370, 105, 113–122; 331/74, 77; 375/329, 334; 455/76, 455/165.1, 255
See application file for complete search history.

(56) References Cited

U.S. PATENT DOCUMENTS

| | | |
|---|---|---|
| 5,598,440 A | 1/1997 | Domagala |
| 5,898,325 A | 4/1999 | Crook et al. |
| 6,434,707 B1 | 8/2002 | Eklof |
| 7,570,096 B2 | 8/2009 | Cafaro et al. |
| 2002/0039396 A1 | 4/2002 | Zalio |
| 2005/0003785 A1* | 1/2005 | Jackson .................. G01S 7/35 455/260 |
| 2011/0057688 A1* | 3/2011 | Mamaril ................ H03B 28/00 327/113 |

OTHER PUBLICATIONS

International Search Report from corresponding International Application No. PCT/US2016/028513, International Search Report dated Jul. 26, 2016 and mailed Aug. 2, 2016 (5 pgs.).
Written Opinion of the International Searching Authority from corresponding International Application No. PCT/US2016/028513, mailed Aug. 2, 2016 (6 pgs.).

* cited by examiner

*Primary Examiner* — Lincoln Donovan
*Assistant Examiner* — Thomas Skibinski
(74) *Attorney, Agent, or Firm* — Lewis Roca Rothgerber Christie LLP

(57) ABSTRACT

A frequency-agile frequency source. The frequency source includes an oscillator having an output and being configured to generate a signal at a first frequency at the output, a first direct digital synthesizer (DDS) having an output and a sampling clock input connected to the output of the oscillator, a filter amplifier block having an input directly connected to the output of the first DDS and an output, and a second DDS having a sampling clock input directly connected to the output of the filter amplifier block. The filter amplifier block is a substantially linear time-invariant element having a frequency response, the magnitude of the frequency response being at least 12 dB lower, at a second frequency within the first Nyquist zone of the first frequency, than at a third frequency above the first Nyquist zone of the first frequency.

20 Claims, 4 Drawing Sheets

DYNAMICALLY CLOCKED DDS FOR SPUR OPTIMIZATION

BACKGROUND

1. Field

One or more aspects of embodiments according to the present invention relate to frequency sources for use as local oscillators, and more particularly to a frequency-agile frequency source with good spurious performance.

2. Description of Related Art

Local oscillator (LO) system applications that require extremely fast frequency tuning capability (i.e., applications that require a frequency-agile frequency source) may use direct-synthesis based architectures. The output of such an architecture may be capable of tuning, i.e., changing frequency, faster than alternatives such as a phase-locked loop (PLL). Direct-synthesis architectures may also achieve better phase noise performance than a PLL-based counterpart. However, a direct digital synthesizer (DDS) may have relatively poor spurious performance. Thus, there is a need for a frequency agile frequency source architecture that provides acceptable spurious performance.

SUMMARY

Aspects of embodiments of the present disclosure are directed toward a frequency-agile frequency source with good spurious performance. A first DDS is connected, through a filter and an amplifier, to a second DDS. A first Nyquist image, or a higher Nyquist image, of the output of the first DDS is used as the clock of the second DDS. Given a frequency required at the output of the second DDS, the frequency of the first DDS is selected so that the ratio of the frequency of the clock of the second DDS to the frequency of the output of the second DDS is favorable, i.e., so that the spurious performance of the second DDS is acceptable.

According to an embodiment of the present invention there is provided a frequency source, including: an oscillator having an output and being configured to generate a signal at a first frequency at the output; a first direct digital synthesizer having an output and a clock input connected to the output of the oscillator; a filter amplifier block having an input directly connected to the output of the first direct digital synthesizer and an output; and a second direct digital synthesizer having a clock input directly connected to the output of the filter amplifier block, the filter amplifier block being a substantially linear time-invariant element having a frequency response, the magnitude of the frequency response being at least 12 dB lower, at a second frequency within the first Nyquist zone of the first frequency, than at a third frequency above the first Nyquist zone of the first frequency.

In one embodiment, the filter amplifier block contains a first filter connected in cascade with an amplifier.

In one embodiment, the amplifier has a gain of more than 5 dB and less than 20 dB.

In one embodiment, the filter is a band-pass filter having a center frequency.

In one embodiment, the center frequency is adjustable.

In one embodiment, the filter is a 3-pole filter.

In one embodiment, the frequency includes a second filter connected to the output of the second direct digital synthesizer.

In one embodiment, the second filter is a band-pass filter.

In one embodiment, the second filter is a 3-pole filter.

In one embodiment, the oscillator is configured to generate a signal at a frequency greater than 1 GHz and less than 10 GHz.

In one embodiment, the second direct digital synthesizer is configured with a frequency ratio at which the second direct digital synthesizer has a spur-free dynamic range of at least 60 dB.

In one embodiment, the second direct digital synthesizer is configured with a frequency ratio that is: greater than 0.18 and less than 0.21, or greater than 0.285 and less than 0.34.

In one embodiment, the frequency includes a processing unit, the processing unit being configured to configure the second direct digital synthesizer with a frequency ratio that is: greater than 0.18 and less than 0.21, or greater than 0.285 and less than 0.34.

In one embodiment, the magnitude of the frequency response is at least 45 dB lower, at a second frequency within the first Nyquist zone of the first frequency, than at a third frequency above the first Nyquist zone of the first frequency.

According to an embodiment of the present invention there is provided a method for generating an approximately sinusoidal signal at a first frequency, the method including: generating, by a first direct digital synthesizer, a first signal, the first signal including a fundamental and one or more Nyquist images; selectively amplifying a Nyquist image of the one or more Nyquist images; providing the selectively amplified Nyquist image to a second direct digital synthesizer, at a sampling clock input of the second direct digital synthesizer; and configuring the second direct digital synthesizer to generate a signal including a fundamental at the first frequency.

In one embodiment, the selectively amplifying of the Nyquist image includes filtering the first signal with a first filter, and amplifying the filtered signal with an amplifier.

In one embodiment, the first filter is a band-pass filter.

In one embodiment, the first filter is a tunable filter.

In one embodiment, the first filter is a 3-pole filter.

In one embodiment, the method includes configuring the second direct digital synthesizer with a frequency ratio that is: greater than 0.18 and less than 0.21, or greater than 0.285 and less than 0.34.

BRIEF DESCRIPTION OF THE DRAWINGS

Features, aspects, and embodiments are described in conjunction with the attached drawings, in which.

DETAILED DESCRIPTION

Figure 1:
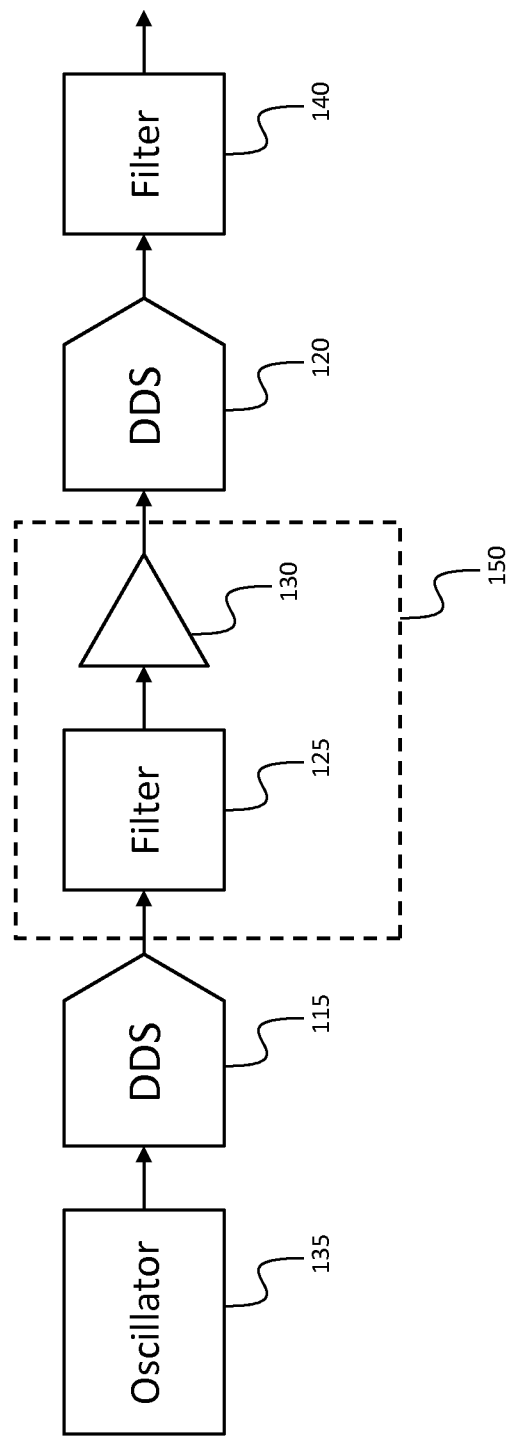
FIG. 1 is a block diagram of a frequency source according to an embodiment of the present invention.

The detailed description set forth below in connection with the appended drawings is intended as a description of exemplary embodiments of a dynamically clocked DDS for spur optimization provided in accordance with the present invention and is not intended to represent the only forms in which the present invention may be constructed or utilized.

The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Direct digital synthesizers (DDSs) may be capable of quickly changing frequencies. A DDS may include a look-up table and a digital-to-analog converter (DAC). A pointer in the lookup table may be adjusted once per cycle of a sampling clock signal received at a sampling clock input of the DDS, and at each clock cycle, the value identified by the pointer, in the lookup table, may be sent to the DAC, converted to an analog voltage, and provided at the output of the DDS. The amount by which the pointer is adjusted may be determined by a phase accumulator that calculates, for a given required output frequency (referred to as the fundamental tone), the phase of the output for each sampling clock cycle. Thus, by selecting the phase increment, the DDS may be configured to generate an approximately sinusoidal output signal with a fundamental tone at a frequency that is a fraction of the sampling clock frequency. The ratio of the fundamental tone to the sampling clock frequency is referred to herein as the "frequency ratio" to which the DDS is set, i.e., with which the DDS is configured.

If the output frequency is one-tenth of the sampling clock frequency, for example, then the phase accumulator may generate an output that advances by $1/10^{th}$ cycle (36 degrees) for each cycle of the sampling clock. The output of the DDS may then be a step-wise approximation to a sine wave at a frequency that is $1/10^{th}$ of the sampling clock frequency.

The output of a DDS may include spurious spectral content, e.g., power at frequencies other than the tone the DDS is configured to generate. These spurious spectral components, or "spurs" may have sufficient power to compromise the performance of the system, such as a radar system, in which the DDS is used. Spurs may be reduced by techniques including the use of a filter bank on the output of the DDS, or by software-based techniques. Filtering can be an effective method; however, wideband systems may require numerous filters, increasing cost, size and weight. Also, for systems that require a wide range of DDS frequencies, an alias or harmonics of an alias may move, as the output frequency is adjusted, through the band toward the desired fundamental output, and filtering may not be effective at all frequencies. Software-based techniques to null spurs may consume significant processing resources, thereby driving up backend cost, size weight and power.

A DDS may have a clock or "sampling clock" input and an output. The signal at the output may be updated once per clock cycle of the sampling clock. Any frequency at the output of the DDS may fall into a Nyquist zone, each of which spans a frequency range equal to one half of the sampling clock frequency. The first Nyquist zone is defined to be the frequency range from 0 (DC) to one-half of the sampling clock frequency, the second Nyquist zone is defined to be the frequency range from one-half of the sampling clock frequency to the sampling clock frequency, the third Nyquist zone is defined to be the frequency range from the sampling clock frequency to three-halves of the sampling clock frequency; further Nyquist zones are defined in an analogous manner, with the $n^{th}$ Nyquist zone extending from $(n-1)*f_s/2$ to $n*f_s/2$, where $f_s$ is the sampling clock frequency (which may also be referred to as $f_{CLK}$). The output signal may have a dominant component, referred to as the fundamental, in the first Nyquist zone, and other tones at other frequencies. The image in the second Nyquist zone, for example, is referred to as the first image, the image in the third Nyquist zone is referred to as the second image; in general the image in the $n^{th}$ Nyquist zone is referred to as the $(n-1)^{th}$ image. To obtain a waveform of acceptable quality (e.g., to obtain a signal in which the separation between the fundamental tone and the first Nyquist image is adequate), a DDS may be operated with a frequency ratio of less than 0.4, i.e., with the fundamental at less than about 0.4 of the sampling clock frequency.

Referring to FIG. 1, in one embodiment two direct digital synthesizers 115, 120 are connected in cascade, so that the first DDS 115 provides the sampling clock signal for the second DDS 120. A filter 125 and an amplifier 130 are connected between the two direct digital synthesizers. A fixed-frequency oscillator 135 provides the clock signal for the first DDS 115. The output of the second DDS 120 is filtered with a second filter 140. The second DDS 120 is operated with a frequency ratio of less than 0.4.

Figure 2:
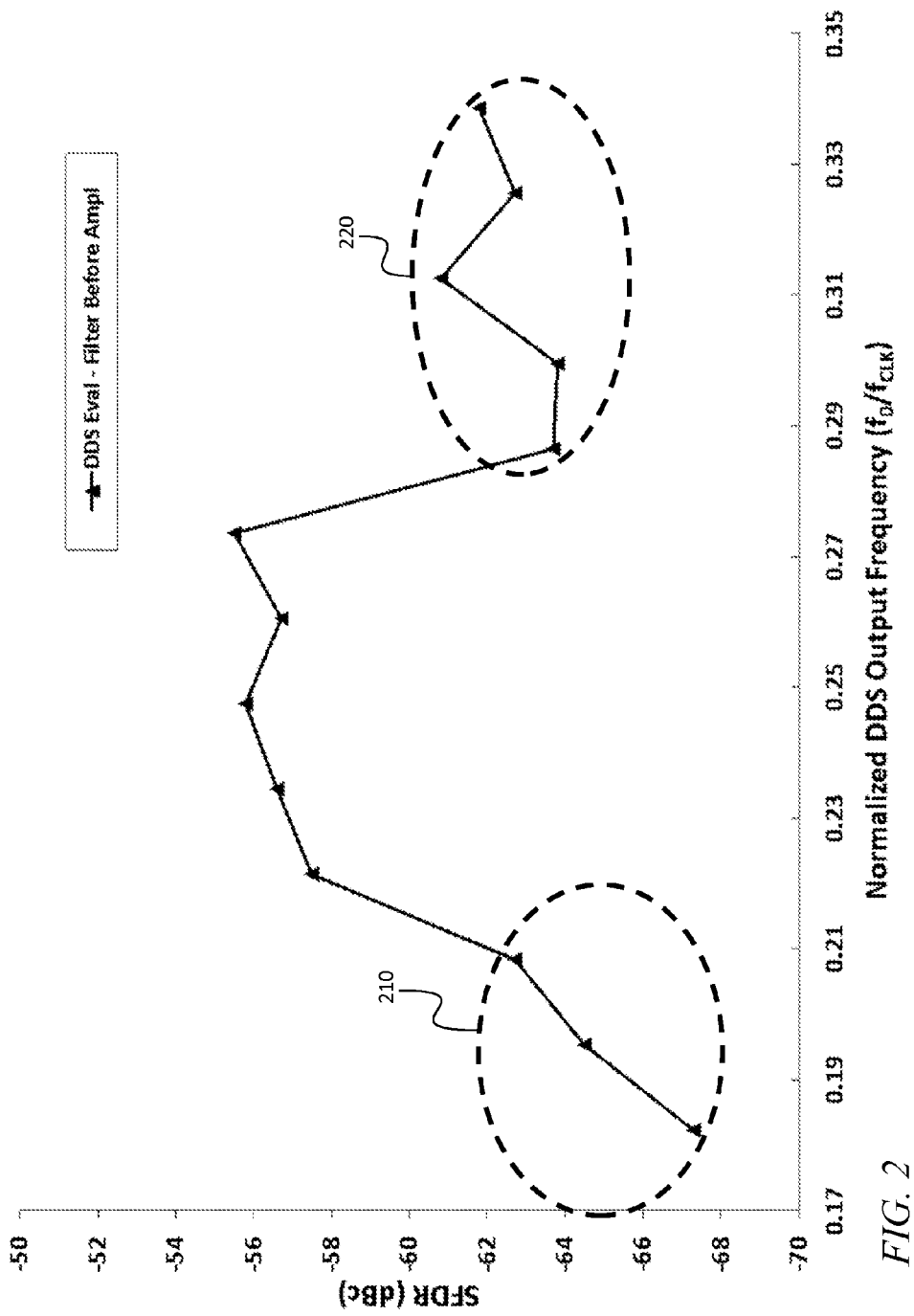
FIG. 2 is a graph of spur free dynamic range of a DDS as a function of the frequency ratio to which the DDS is set, according to an embodiment of the present invention.

In one embodiment, the spurious performance of the second DDS 120 depends on the frequency ratio with which it operates. Referring to FIG. 2, the spurious performance may be better for frequency ratios (ratios of $f_O/f_{CLK}$) that are in a first range 210 between about 0.18 and about 0.21, or in a second range 220 between about 0.285 and about 0.34. If the system requirements dictate a spur-free dynamic range (SFDR) of 60 dB or better, then frequency ratios that are within one of these ranges may meet requirements whereas ratios outside of these ranges may not. In one embodiment, the clock frequency fed to the second DDS 120 is adjusted, for any given required system output frequency, so that the frequency ratio is within one of these ranges.

In one embodiment the frequency of the oscillator 135 is about 2.5 times the highest required system output frequency. If the first DDS 115 of the cascade of FIG. 1 is operated with a frequency ratio of less than 0.4, however, then the range of input sampling clock frequencies available to the second DDS 120 may not be sufficient for the second DDS 120 to achieve the required system output frequency range. For example, if the oscillator 135 operates at 4.0 GHz, and the system output frequency range requirement is 640 MHz to 1.3 GHz, then a single DDS would be able to accommodate the required output frequency range (1.3 GHz being less than 0.4 times 4.0 GHz), but the second DDS 120 of FIG. 1, if supplied, by the first DDS 115, with a sampling clock frequency of 1.6 GHz (4.0 GHz times 0.4), would be limited to 0.64 GHz if constrained to operate with a frequency ratio of less than 0.4 (i.e., $f_O/f_{CLK}<0.4$).

Figure 3:
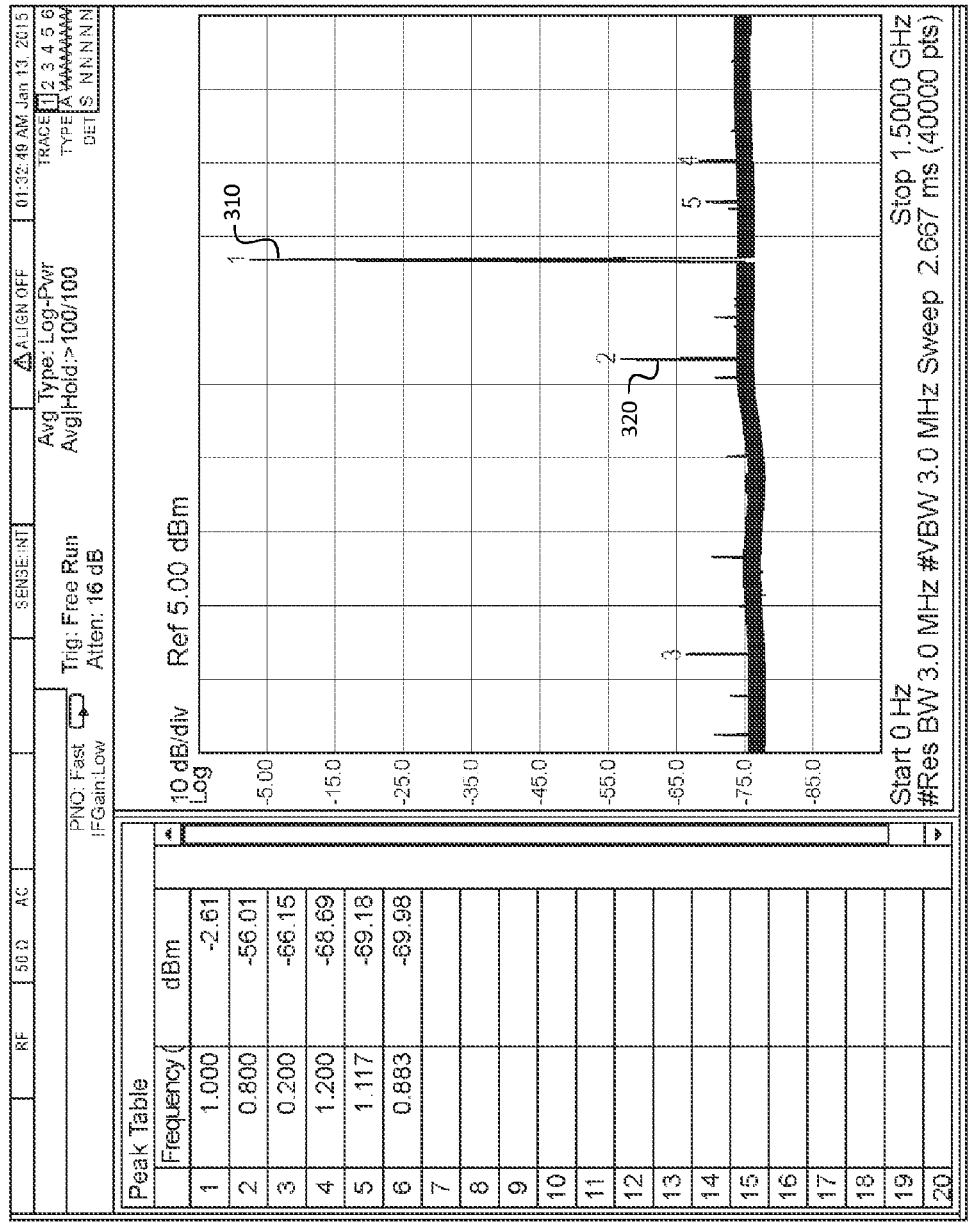
FIG. 3 is a screen shot of a power spectrum and peak table corresponding to the output of a circuit according to the embodiment of FIG. 1 for one frequency ratio.

In one embodiment, this loss of maximum frequency in the cascade is addressed by using, as the sampling clock of the second DDS 120, a Nyquist image instead of the fundamental at the output of the first DDS 115. Referring to FIG. 3, in one embodiment, the oscillator 135 operates at a frequency of 3.84 GHz, and the system output frequency is required to be 1.0 GHz. To provide the required output frequency, the first DDS 115 is set for a fundamental frequency of 1.04 GHz. This results in a first Nyquist image (i.e., a tone in the second Nyquist zone) of 3.84 GHz−1.04 GHz=2.8 GHz. This 2.8 GHz tone is selected by the first filter 125 and is used as the sampling clock by the second DDS 120, for which the frequency ratio is then 1.0 GHz/2.8 GHz=0.36, which satisfies the constraint $f_O/f_{CLK}<0.4$. Referring to FIG. 3, the output of the system includes the fundamental tone 310 and a tone 320 at 800 MHz with a magnitude of −56.01 dBm. The tone 320 is an alias of the second harmonic of the fundamental tone 310 that occurs at a frequency of $f_O-2*f_{CLK}$ (i.e., 2.8 GHz–2*1.0 GHz=800 MHz). This alias may be important in DDS systems because it may have relatively large amplitude, and because it can fall arbitrarily close to the fundamental tone 310, being at the same frequency as the fundamental tone 310 if $f_{CLK}/f_O$=3. In the configuration of FIG. 3, the frequency ratio ($f_O/f_{CLK}$=0.36) does not fall into either of the ranges of FIG. 2 in which the DDS has an SFDR of 60 dB or better, and in this example, the SFDR is –2.61 dBm–(–56.01 dBm)=53.4 dB, which may be inadequate.

Figure 4:
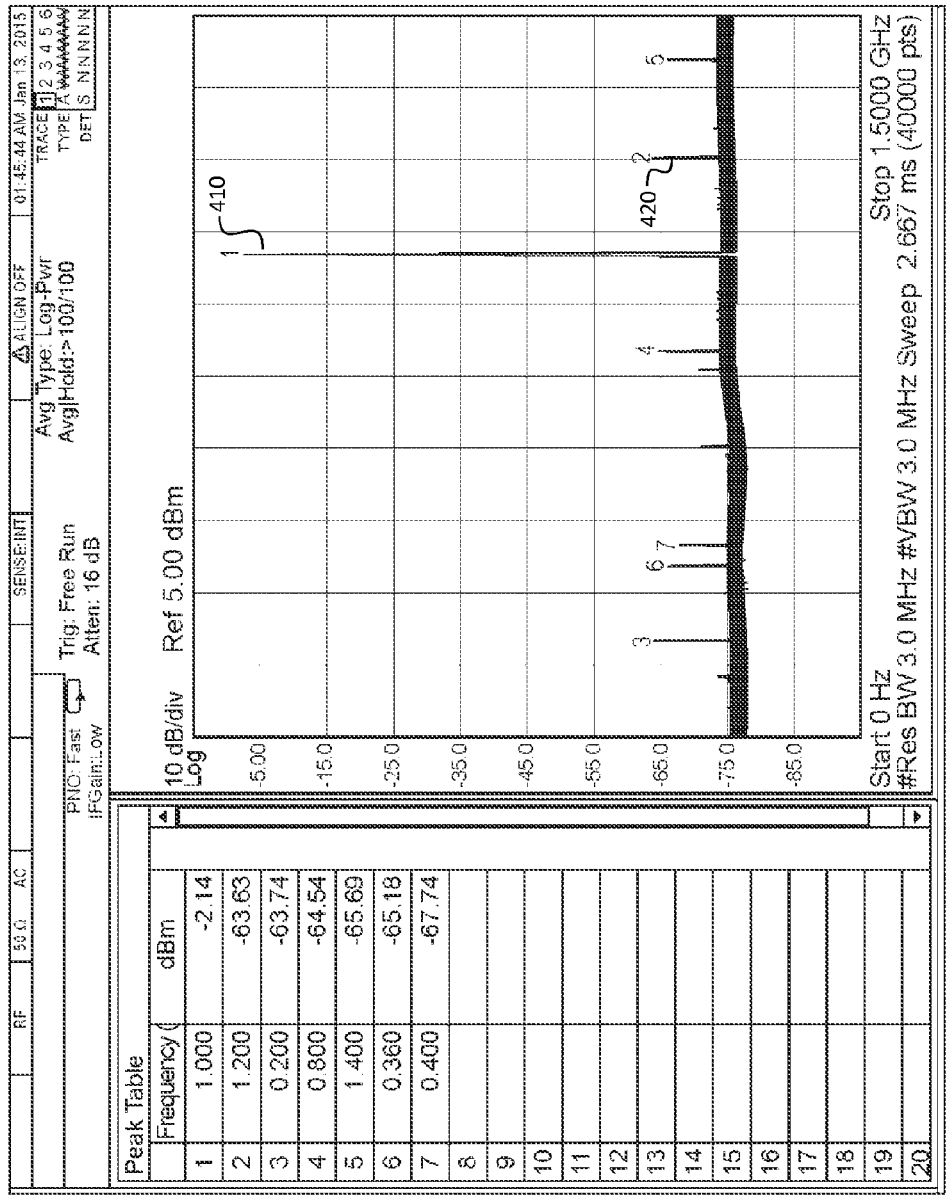
FIG. 4 is a screen shot of a power spectrum and peak table corresponding to the output of a circuit according to the embodiment of FIG. 1 for another frequency ratio.

Referring to FIG. 4, the performance of the system may be improved by setting the fundamental output frequency of the first DDS 115 instead to 640 MHz, so that the first Nyquist image falls at 3.84 GHz–0.640 GHz=3.2 GHz. The frequency ratio is then 1.0 GHz/3.2 GHz=0.31, which satisfies the constraint $f_O/f_{CLK}$<0.4, and which also falls into one of the ranges of FIG. 2 in which the DDS has an SFDR of 60 dB or better. In particular, the SFDR of FIG. 2 at a ratio $f_O/f_{CLK}$ is approximately 60.5 dB. In FIG. 4, the ratio of (i) the power in the alias 420 of the second harmonic of the fundamental tone 410 to (ii) the power in the fundamental tone 410 is –2.14 dBm–(–63.64 dBm)=60.5 dB. Thus the performance shown in FIG. 4 is consistent with that expected from FIG. 2.

Referring again to FIG. 1, the connection between the first DDS 115 and the second DDS 120, consisting of the first filter 125 and an amplifier 130, may be a linear time-invariant system, which may be referred to as a filter amplifier block 150. The filter amplifier block 150 may include a separate filter (the first filter 125) and amplifier 130, and the first filter 125 may precede the amplifier 130 as in the embodiment of FIG. 1 (i.e., the first filter 125 may be at the input of the filter amplifier block 150), or the amplifier 130 may precede the first filter 125, or the filter amplifier block 150 may be a single element, e.g., an amplifier configured to have both gain and a band-pass frequency response. Being a linear time-invariant system, the filter amplifier block 150 may be less likely to generate harmonics and intermodulation products than a nonlinear system that otherwise could be employed to increase the frequency of the fundamental tone of the first DDS 115. The first filter 125 may attenuate the fundamental tone at the output of the first DDS 115 sufficiently that the fundamental tone is lower in amplitude than the first image, so that the principal signal at the sampling clock input of the second DDS 120 will be the first image. For example, if the fundamental tone has an amplitude 12 dB greater than the first image at the output of the first DDS 115, the first filter 125 may have a frequency response that is at least 12 dB lower at the frequency of the fundamental tone than at the frequency of the first image.

In other embodiments the first filter 125 may attenuate the fundamental (and/or other images not to be used by the second DDS 120, as discussed below) by more than 12 dB, to further reduce the likelihood that undesired tones at the input of the second DDS 120 may degrade its performance. A 3-pole Chebyshev or Butterworth filter may be used as the first filter 125, for example, to provide attenuation of the fundamental tone of 45 dB to 59 dB, when the first image is used as the sampling clock signal for the second DDS 120.

The first filter 125 may also attenuate other images; more generally, it may pass the image being used as the sampling clock for the second DDS 120, and attenuate other images and the fundamental tone. For example, if the first image is used as the sampling clock signal for the second DDS 120, then the first filter 125 may attenuate the fundamental tone, and it may also attenuate the second image and other higher images. If another image is used as the sampling clock signal for the second DDS 120, then the first filter 125 may attenuate other images, higher or lower in frequency than the image being used (as well as the fundamental). For example, the center frequency of the first filter 125 may be selected so that the signal at the sampling clock input of the second DDS 120 is the first Nyquist image or another Nyquist image, e.g., the second, third, fourth or fifth Nyquist image. For example, the fifth Nyquist image may be at a frequency $f_6=3*f_{OSC}-f_1$, where $f_6$ is the frequency of the fifth Nyquist image (i.e., the image in the sixth Nyquist zone), $f_{OSC}$ is the frequency of the oscillator 135, and $f_1$ is the frequency of the fundamental.

The amplifier 130 may provide a signal at the sampling clock input of the second DDS 120 with a suitable power level for reliable operation of the second DDS 120. The second DDS 120 may require a sampling clock signal with 0-10 dBm of power. The output of the first DDS 115 may be between 0 dBm and –2 dBm, and the filter may attenuate the signal by 3 to 4 dB. An amplifier 130 with about 15 dB of gain may therefore be used to increase the signal level after the filter to an acceptable level for use as the sampling clock of the second DDS 120.

More generally, a local oscillator constructed according to embodiments of the present invention may be configured to select an input sampling clock frequency at the second DDS 120 such that for any frequency required at the system output (i.e., at the output of the second filter 140), the frequency ratio at which the second DDS 120 operates is in one of the ranges within which the DDS exhibits good SFDR. Moreover, in other embodiments, the frequency of the harmonic at $f_O-2*f_{CLK}$ may be adjusted to have a frequency that is not close to that of the fundamental (by selecting $f_{CLK}$ to be correspondingly greater or less than $3*f_O$), so that it may be further suppressed by a band-pass filter.

In one embodiment one of the DDSs is a model AD9914 DDS (or both of the DDSs are model AD9914 DDSs) available from Analog Devices of Norwood, Mass. The first filter 125 may be a band-pass filter with a selectable or adjustable center frequency. In one embodiment the first filter 125 is constructed as a bank of fixed band-pass filters, with a multi-pole input switch and a multi-pole output switch for selecting which of the fixed band-pass filters of the bank of fixed band-pass filters is switched in. Each of the fixed band-pass filters of the bank of fixed band-pass filters may be a filter composed inductors, capacitors, and resistors (an RLC filter) in a pi or tee (or "T") configuration, and it may be a low-order filter, e.g., a three pole filter. In another embodiment the first filter 125 is a tunable filter, e.g., a filter having an inductor and a microelectromechanical systems (MEMS) capacitor. In this embodiment the capacitance of the MEMS capacitor may be controlled electrically to adjust the center frequency of the band-pass filter.

The second filter 140 may be a fixed band-pass filter with a pass band selected to pass a range of frequencies slightly greater than the required frequency range of the frequency source. It may help to attenuate harmonics of the fundamental tone of the second DDS 120, and also to attenuate Nyquist images in the output of the second DDS 120. For example, if the frequency source is required to cover the frequency range from 640 MHz to 1.3 GHz, then the pass band of the second filter 140 may extend from 600 MHz to 1.36 GHz. The second filter 140 may be a 3-pole filter.

Parts of the methods described herein may be performed by a processing unit, or by a processing unit connected to a memory. For example, a processing unit may be used to select a sampling clock frequency for the second DDS 120, given a required output frequency for the second DDS 120 and a set of requirements for the frequency ratio (e.g., to insure acceptable SFDR), and to select a fundamental frequency for the first DDS 115, so that one of the Nyquist images at the output of the first DDS 115 will be at the frequency selected as the sampling clock frequency for the second DDS 120. In one embodiment, the same Nyquist image at the output of the first DDS 115 is used throughout operation, and the frequency of the selected image is shifted as needed, as the system output frequency is adjusted, so that the ratio of $f_O/f_{CLK}$ is in a range for which the second DDS 120 has good spurious performance. In other embodiments different Nyquist images at the output of the first DDS 115 may be used as the system output frequency changes.

The term "processing unit" is used herein to include any combination of hardware, firmware, and software, employed to process data or digital signals. Processing unit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing unit, as used herein, each function is performed either by hardware configured, i.e., hard-wired, to perform that function, or by more general purpose hardware, such as a CPU, configured to execute instructions stored in a non-transitory storage medium. A storage medium such as a memory may be part of the processing unit, or it may be a separate component. A processing unit may be fabricated on a single printed wiring board (PWB) or distributed over several interconnected PWBs. A processing unit may contain other processing units; for example a processing unit may include two processing units, an FPGA and a CPU, interconnected on a PWB.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art. As used herein, the term "major component" means a component constituting at least half, by weight, of a composition, and the term "major portion", when applied to a plurality of items, means at least half of the items.

As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present invention". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although limited embodiments of a dynamically clocked DDS for spur optimization have been specifically described and illustrated herein, many modifications and variations will be apparent to those skilled in the art. Accordingly, it is to be understood that a dynamically clocked DDS for spur optimization employed according to principles of this invention may be embodied other than as specifically described herein. The invention is also defined in the following claims, and equivalents thereof.

What is claimed is:

1. A frequency source, comprising:
an oscillator having an output and being configured to generate a signal at a first frequency at the output;
a first direct digital synthesizer having an output and a clock input connected to the output of the oscillator;

a filter amplifier block having an input directly connected to the output of the first direct digital synthesizer and an output; and a second direct digital synthesizer having a clock input directly connected to the output of the filter amplifier block, the filter amplifier block being a substantially linear time-invariant element having a frequency response, the magnitude of the frequency response being at least 12 dB lower, at a second frequency within the first Nyquist zone of the first frequency, than at a third frequency above the first Nyquist zone of the first frequency.

2. The frequency source of claim 1, wherein the filter amplifier block contains a first filter connected in cascade with an amplifier.

3. The frequency source of claim 2, wherein the amplifier has a gain of more than 5 dB and less than 20 dB.

4. The frequency source of claim 2, wherein the filter is a band-pass filter having a center frequency.

5. The frequency source of claim 4, wherein the center frequency is adjustable.

6. The frequency source of claim 2, wherein the filter is a 3-pole filter.

7. The frequency source of claim 1, further comprising a second filter connected to the output of the second direct digital synthesizer.

8. The frequency source of claim 7, wherein the second filter is a band-pass filter.

9. The frequency source of claim 8, wherein the second filter is a 3-pole filter.

10. The frequency source of claim 1, wherein the oscillator is configured to generate a signal at a frequency greater than 1 GHz and less than 10 GHz.

11. The frequency source of claim 1, wherein the second direct digital synthesizer is configured with a frequency ratio at which the second direct digital synthesizer has a spur-free dynamic range of at least 60 dB.

12. The frequency source of claim 1, wherein the second direct digital synthesizer is configured with a frequency ratio that is:

greater than 0.18 and less than 0.21, or greater than 0.285 and less than 0.34.

13. The frequency source of claim 1, further comprising a processing unit, the processing unit being configured to configure the second direct digital synthesizer with a frequency ratio that is:

greater than 0.18 and less than 0.21, or greater than 0.285 and less than 0.34.

14. The frequency source of claim 1, wherein the magnitude of the frequency response is at least 45 dB lower, at a second frequency within the first Nyquist zone of the first frequency, than at a third frequency above the first Nyquist zone of the first frequency.

15. A method for generating an approximately sinusoidal signal at a first frequency, the method comprising:

generating, by a first direct digital synthesizer, a first signal, the first signal including a fundamental and one or more Nyquist images;

selectively amplifying a Nyquist image of the one or more Nyquist images;

providing the selectively amplified Nyquist image to a second direct digital synthesizer, at a sampling clock input of the second direct digital synthesizer; and configuring the second direct digital synthesizer to generate a signal including a fundamental at the first frequency.

16. The method of claim 15, wherein the selectively amplifying of the Nyquist image comprises filtering the first signal with a first filter, and amplifying the filtered signal with an amplifier.

17. The method of claim 16, wherein the first filter is a band-pass filter.

18. The method of claim 17, wherein the first filter is a tunable filter.

19. The method of claim 16, wherein the first filter is a 3-pole filter.

20. The method of claim 15, further comprising configuring the second direct digital synthesizer with a frequency ratio that is:

greater than 0.18 and less than 0.21, or greater than 0.285 and less than 0.34.

* * * * *